(12) United States Patent
Nara et al.

(10) Patent No.: US 6,577,664 B1
(45) Date of Patent: Jun. 10, 2003

(54) EXCIMER LASER DEVICE

(75) Inventors: Hisashi Nara, Hiratsuka (JP); Toshihiro Nishisaka, Hiratsuka (JP)

(73) Assignees: Komatsu Ltd., Tokyo (JP); Ebara Corporation, Tokyo (JP)

( * ) Notice: Subject to any disclaimer, the term of this patent is extended or adjusted under 35 U.S.C. 154(b) by 0 days.

(21) Appl. No.: 09/466,063

(22) Filed: Dec. 17, 1999

(30) Foreign Application Priority Data

Dec. 18, 1998 (JP) .......................................... 10-375919

(51) Int. Cl.[7] ................................................. H01S 3/22
(52) U.S. Cl. ................................ 372/58; 58/372; 58/57
(58) Field of Search ..................................... 372/57, 58

(56) References Cited

U.S. PATENT DOCUMENTS

| | | | | |
|---|---|---|---|---|
| 4,891,818 A | * | 1/1990 | Levatter ........................ 372/57 |
| 4,899,363 A | * | 2/1990 | Murray et al. ................. 372/65 |
| 5,291,509 A | * | 3/1994 | Mizoguchi et al. ............ 372/65 |
| 5,770,933 A | * | 6/1998 | Larson et al. ................ 318/254 |
| 5,783,887 A | * | 7/1998 | Ueyama et al. ............. 310/90.5 |
| 5,848,089 A | * | 12/1998 | Sarkar et al. .................. 372/58 |
| 5,947,394 A | * | 9/1999 | Egan, III et al. .............. 241/30 |
| 6,018,537 A | * | 1/2000 | Hofmann et al. .............. 372/25 |
| 6,337,872 B1 | * | 1/2002 | Nara et al. ..................... 372/58 |
| 6,208,675 B1 | * | 3/2002 | Webb ............................ 372/58 |

* cited by examiner

*Primary Examiner*—Paul Ip
*Assistant Examiner*—James Menefee
(74) *Attorney, Agent, or Firm*—Armstrong, Westerman & Hattori, LLP.

(57) ABSTRACT

An excimer laser device capable of suppressing vibration of a cross flow fan, and preventing breakage of magnetic bearings when the vibration increases is provided. For this purpose, the device has a configuration that in the excimer laser device including magnetic bearings (12) each having an inner ring section (10, 30) and an outer ring section (11, 31), and a cross flow fan (1) for circulating a laser gas in a chamber (2), touch-down bearings (15) are provided on the outer peripheral side of a rotating shaft (9), and the inner peripheral face of an inner peripheral portion (15B) of the touch-down bearing (15) and the outer peripheral face of the rotating shaft (9) are disposed opposite each other with a predetermined clearance smaller than a gap (4) between the outer peripheral face of the inner ring section (10, 30) and the inner peripheral face of the outer ring section (11, 31).

3 Claims, 6 Drawing Sheets

EXCIMER LASER DEVICE

TECHNICAL FIELD

The present invention relates to an excimer laser device, and particularly relates to an excimer laser device having a cross flow fan for circulating a laser gas.

BACKGROUND ART

Figure 5:
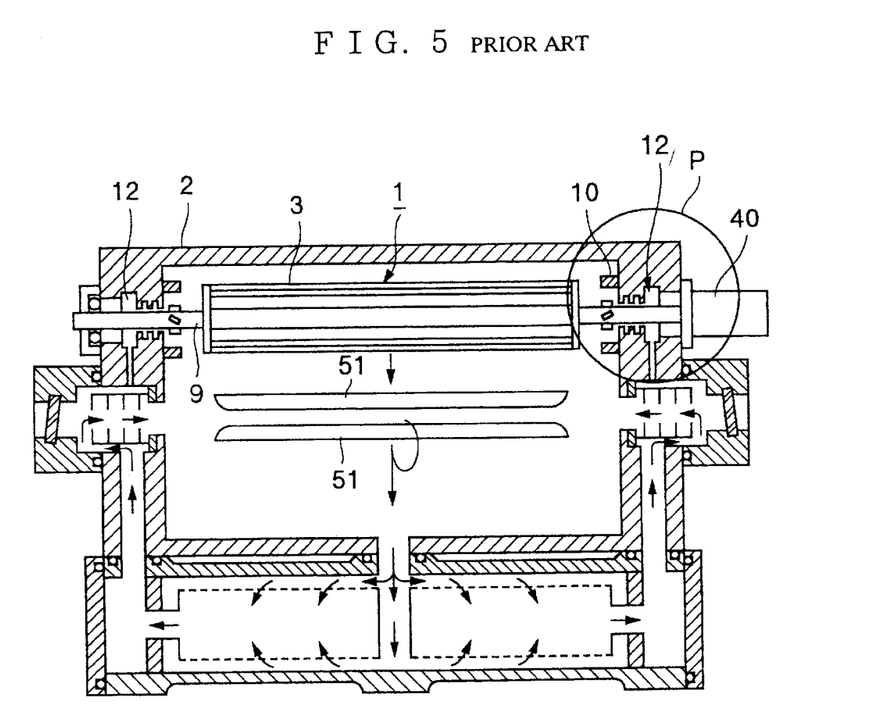
FIG. 5 is a sectional view of an excimer laser device according to a prior art.
Figure 6:
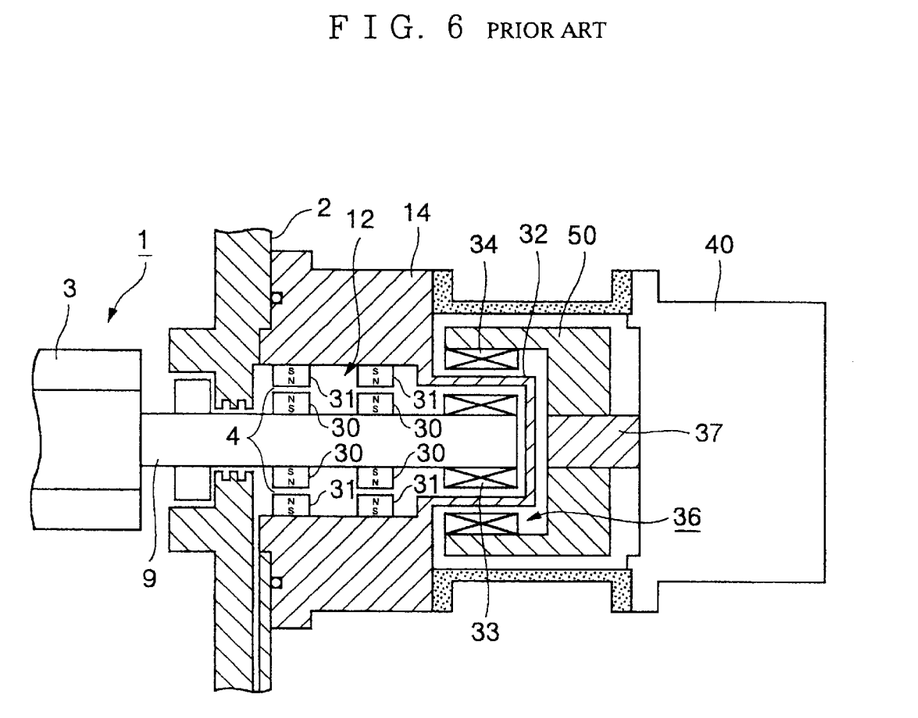
FIG. 6 is a detailed sectional view of the portion P in FIG. 5.

An excimer laser device using a cross flow fan of which a rotating shaft is supported by magnetic bearings is conventionally known. FIG. 5 and FIG. 6 show an example of an art disclosed in Japanese Patent Laid-open No. 10-173259. FIG. 5 is a sectional side view showing the entire configuration of the excimer laser device, and FIG. 6 is a detailed view of the portion P in FIG. 5. The prior art will be explained below based on FIG. 5 and FIG. 6.

In FIG. 5 and FIG. 6, a laser gas which is a medium for oscillating laser light is sealed in a chamber 2 of the excimer laser device. A cross flow fan 1 provided with a blade section 3 having a plurality of blades and a rotating shaft 9 is disposed in a predetermined position in the chamber 2. The laser gas is circulated by giving driving force to the rotating shaft 9 to rotate the blade section 3, thereby being guided to a space between discharge electrodes 51 and 51. The laser gas is excited by applying a predetermined high voltage across the discharge electrodes 51 and 51, thus oscillating laser light.

The rotating shaft 9 of the cross flow fan 1 is rotatably supported by non-contact magnetic bearings 12 and 12. The magnetic bearings 12 and 12 each include permanent magnets 30, which are annularly mounted on the outer periphery of the rotating shaft 9 and rotate integrally with the rotating shaft 9, and permanent magnets 31 mounted on the inner wall of a casing 14 attached to the outer side of a side wall of the chamber 2. The permanent magnet 31 annularly surrounds the outer periphery of the permanent magnet 30 with a predetermined gap 4 between them. Opposite faces of the permanent magnets 30 and 31 have the same magnetic poles, and the rotating shaft 9 is rotatably supported in a non-contact state by utilizing repulsion between the permanent magnets 30 and 31. In the above configuration, the permanent magnet 30 corresponds to an inner ring section of the magnetic bearing 12, and the permanent magnet 31 corresponds to an outer ring section of the magnetic bearing 12.

A permanent magnet 33 is attached to one end (the right end of FIG. 6) of the rotating shaft 9 of the cross flow fan 1, and faces a permanent magnet 34 across a barrier section 32. The permanent magnet 34 is attached to a motor rotating shaft 37 of a motor 40 attached to the outer wall of the chamber 2, with a magnet supporting body 50 between them. The permanent magnets 33 and 34 compose a magnetic torque coupling 36 for transmitting driving force of the motor 40 to the cross flow fan 1.

The aforesaid excimer laser device disclosed in Japanese Patent Laid-open No. 10-173259, however, has the following disadvantages.

Specifically, since the pressure of the laser gas is high (normally two or more atmospheres) in the excimer laser device, the resistance of the laser gas is large when the cross flow fan 1 rotates in the excimer laser device, thus causing the cross flow fan 1 to vibrate. Imbalance of the weight of the cross flow fan 1 itself also causes vibration. Such vibration extremely increases, for example, when the cross flow fan 1 resonates or the blade section 3 twists.

However, according to the aforesaid prior art, no means for suppressing the vibration and protecting the magnetic bearing 12 against breakage when the cross flow fan 1 vibrates is provided. Thus, there arises a disadvantage that force larger than the repulsion between the permanent magnets 30 and 31 of the magnetic bearing 12 is applied to the magnetic bearing 12, thus causing the permanent magnet 30 and the permanent magnet 31 to collide with each other to thereby break the magnetic bearing 12.

The vibration of the cross flow fan 1 is further increased by such breakage, thus sometimes causing the optical axis of the excimer laser device to deviate, and moreover causing the cross flow fan 1 to come off the magnetic bearing 12 to thereby collide with components such as discharge electrodes and the like. In the above case, it is required to stop the excimer laser device and replace the magnetic bearing 12, which causes a disadvantage that this work takes a great deal of time, labor, and cost.

SUMMARY OF THE INVENTION

The present invention is made in view of the aforesaid disadvantages, and its object is to provide an excimer laser device having the functions of suppressing vibration of a cross flow fan, and preventing breakage of magnetic bearings when the vibration increases in spite of the above suppression.

A first configuration of an excimer laser device according to the present invention is characterized in that an excimer laser device having magnetic bearings each having an inner ring section mounted on the outer periphery of a rotating shaft and an outer ring section supported by a chamber, and a cross flow fan rotatably supported in a non-contact state in the chamber by the magnetic bearings via the rotating shaft and circulating a laser gas in the chamber, includes touch-down bearings on the outer peripheral side of the rotating shaft, and that the inner peripheral face of an inner peripheral portion of the touch-down bearing and the outer peripheral face of the rotating shaft are disposed opposite each other with a predetermined clearance smaller than a gap between the outer peripheral face of the inner ring section and the inner peripheral face of the outer ring section.

According to the above configuration, the touch-down bearing is disposed on the outer peripheral portion of the rotating shaft with a predetermined clearance between them. Therefore, when the rotating shaft vibrates, the rotating shaft collides with the touch-down bearing before the inner ring section of the magnetic bearing collides with the outer ring section thereof. Thus, the inner ring section and the outer ring section of the magnetic bearing do not collide with each other, thereby preventing the breakage of the magnetic bearing. Consequently, the rate of operation of the excimer laser device is improved.

A second configuration of an excimer laser device according to the present invention is characterized in that an excimer laser device having magnetic bearings each having an inner ring section mounted on the outer periphery of a rotating shaft and an outer ring section supported by a chamber, and a cross flow fan rotatably supported in a non-contact state in the chamber by the magnetic bearings via the rotating shaft and circulating a laser gas in the chamber, includes gap measuring means each for measuring a value of a gap between the outer peripheral face of the inner ring section and the inner peripheral face of the outer ring section, and gap controlling means each for controlling the value of the gap within a predetermined range based on signal output from the gap measuring means.

According to the above configuration, the gap measuring means for measuring the gap and the gap controlling means for controlling the gap are provided, which makes it possible to control the gap to suppress the vibration of the rotating shaft, thereby reducing vibration of the cross flow fan. As a result, the optical axes of optical elements of the excimer laser device scarcely deviate, thereby stabilizing the characteristic of laser light. Moreover, the breakage of the magnetic bearing is prevented, thus improving the rate of operation of the excimer laser device.

A third configuration of an excimer laser device according to the present invention is characterized in that an excimer laser device having magnetic bearings each having an inner ring section mounted on the outer periphery of a rotating shaft and an outer ring section supported by a chamber, and a cross flow fan rotatably supported in a non-contact state in the chamber by the magnetic bearings via the rotating shaft and circulating a laser gas in the chamber, includes gap measuring means each for measuring a value of a gap between the outer peripheral face of the inner ring section and the inner peripheral face of the outer ring section, and that laser oscillation is stopped and rotation of a motor for driving the rotating shaft is stopped when the measured value is smaller than a predetermined value.

According to the above configuration, when abnormal vibration occurs, the rotation of the motor is stopped. As a result, the cross flow fan never rotates in the state of abnormal vibration, thereby preventing the breakage of components such as the cross flow fan and the like. Hence, the rate of operation of the excimer laser device is improved.

BEST MODE FOR CARRYING OUT THE INVENTION

A preferred embodiment according to the present invention will be explained in detail below with reference to FIG. 1 to FIG. 4. Incidentally, in the following embodiment, the same numerals and symbols will be given to the same elements as those in the Figures used for the explanation of the aforesaid prior art, thereby omitting repeated explanation.

Figure 1:
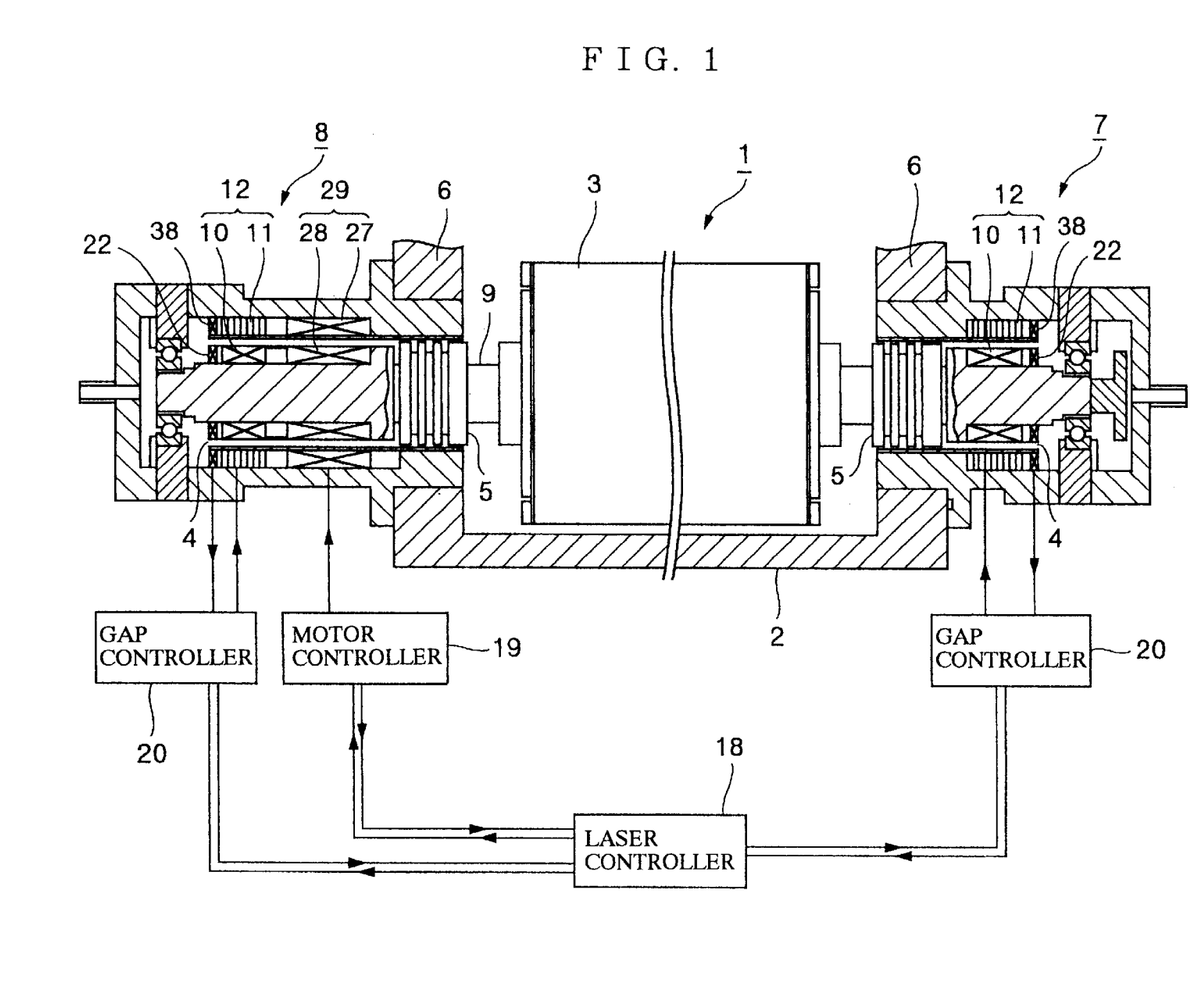
FIG. 1 is a partial sectional view of an excimer laser device according to an embodiment of the present invention.

In FIG. 1, a laser gas is sealed in a chamber 2. A cross flow fan 1 is disposed in a predetermined position in the chamber 2, and the laser gas is circulated by the cross flow fan 1 and sent to a space between discharge electrodes not illustrated. An electric discharge is initiated by applying high voltage across the discharge electrodes from a high voltage power supply not illustrated based on a command from a laser controller 18 for controlling an excimer laser device, thus exciting the laser gas to oscillate laser light.

The cross flow fan 1 includes a blade section 3 having a plurality of blades for circulating the laser gas and a rotating shaft 9 for rotating the blade section 3. The rotating shaft 9 penetrates side walls 6 and 6 on both sides of the chamber 2, and is rotatably supported at both ends thereof by magnetic bearings 12 and 12. These magnetic bearings 12 and 12 include outer ring magnet coils 11 and 11, and inner ring magnetic substances 10 and 10 which are annularly mounted on the outer peripheral face of the rotating shaft 9, and rotate integrally with the rotating shaft 9, respectively. The outer ring magnet coils 11 and 11 are respectively mounted on the inner peripheral faces of a nearly cylindrical bearing housing 7 and motor housing 8 respectively attached to the outer sides of both the side walls 6 and 6. Here, the inner ring magnetic substance 10 is an example of an inner ring section composing the magnetic bearing 12, and the outer ring magnet coil 11 is an example of an outer ring section composing the magnetic bearing 12.

The outer peripheral face of each of the inner ring magnetic substances 10 and 10 and the inner peripheral face of each of the outer ring magnet coils 11 and 11 are opposite each other with a gap 4 having a predetermined value between them. A current introducing means not illustrated (for example, wiring or the like) which is provided penetrating the bearing housing 7 and the motor housing 8 from a gap controller 20 is connected to the outer ring magnet coils 11 and 11. An electric current is sent via the current introducing means to thereby allow the outer ring magnet coils 11 and 11 to generate predetermined electromagnetic force. The inner ring magnetic substances 10 and 10 are attracted or repelled by this electromagnetic force, and the rotating shaft 9 is rotatably supported in a non-contact state by this magnetic force.

In order to measure the value of the gap 4, magnets 22 and 22 annularly mounted on the outer peripheral face in the vicinities of the right and left ends of the rotating shaft 9 and gap sensors 38 and 38 mounted on the inner peripheral faces of the bearing housing 7 and the motor housing 8 respectively are provided.

The cross flow fan 1 is driven by a motor 29 provided in the motor housing 8. The motor 29 includes a stator 27 mounted on the inner peripheral face of the motor housing 8 and a rotor 28 annularly mounted on the outer peripheral face of the rotating shaft 9 and rotating integrally with the rotating shaft 9. The inner peripheral face of the stator 27 and the outer peripheral face of the rotor 28 are disposed opposite each other, and an electric current is sent to the stator 27 via the current introducing means to generate a rotating magnetic field in the inner peripheral portion of the stator 27, thereby rotating the rotor 28 to directly drive the cross flow fan 1.

The motor 29 is driven by output from a motor controller 19. The motor controller 19 and the gap controller 20 are electrically connected to the laser controller 18, and they can send and receive electric signals to and from the laser controller 18.

Labyrinths 5 and 5 each provided with a plurality of grooves are formed on the outer peripheral face of the rotating shaft 9 in the vicinities of connecting portions of the motor housing 8 and the bearing housing 7 with the chamber 2. The labyrinths 5 and 5 prevent impurities produced in the chamber 2 from entering the motor housing 8 and the bearing housing 7.

Next, explanation will be given with reference to FIG. 2 to FIG. 4. The motor housing 8 includes a hollow and nearly cylindrical supporting member 23, a bearing holder 16, and a cap 24. The bearing holder 16 is provided at the outer end of the supporting member 23 and holds a touch-down bearing 15 for preventing breakage of the magnetic bearing 12 due to vibration of the rotating shaft 9. The cap 24 is provided at the outer end of the bearing holder 16 and seals a space inside the motor housing 8 in which the cap 24 together with the bearing holder 16 is fastened to the supporting member 23 with a bolt 35. The cap 24 includes a purge port 17 for poring a clean laser gas. It is suitable that they are made of materials having corrosion resistance, for example, SUS 316 (JIS code representing one kind of stainless steel).

An inner end of the supporting member 23 is fixed to the side wall 6 of the chamber 2 with a bolt 13. The supporting member 23 is provided with an O-ring groove 43 in a face thereof abutting on the side wall 6, and an O-ring 44 is fitted in the O-ring groove 43 to seal in the laser gas. The bearing holder 16 is provided with O-ring grooves 41 and 41 in its joint faces with the supporting member 23 and the cap 24 respectively, and O-rings 42 and 42 are fitted in the O-ring grooves 41 and 41 to seal in the laser gas.

Figure 2:
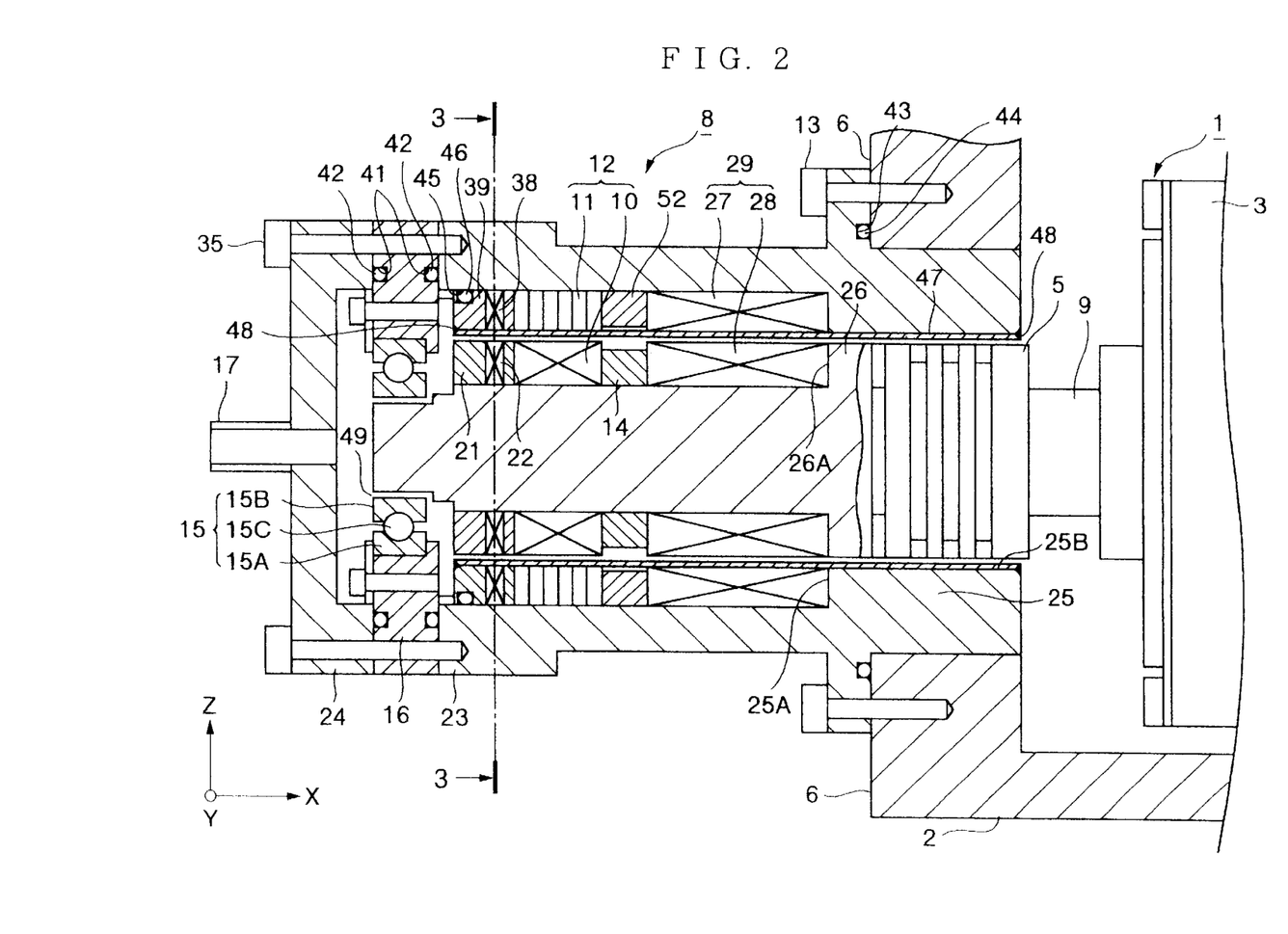
FIG. 2 is a detailed sectional view of the vicinity of a motor housing in FIG. 1.

On the outer peripheral face of the rotating shaft 9, the columnar rotor 28 made of a ferromagnetic metal provided with a through-hole in the center thereof is pressed in from the left side of FIG. 2 (the outside of the chamber 2) to a position where the rotor 28 abuts on an end face 26A of a rotating shaft protrusion 26 formed protruding from the outer peripheral face of the rotating shaft 9. The rotor 28 is polarized so as to have different magnetic poles alternately along its outer periphery (for example, at four positions). Further, on the outer peripheral face of the rotating shaft 9, following a hollow cylindrical bush 14, the hollow cylindrical inner ring magnetic substance 10 is pressed in from the left side of FIG. 2. Furthermore, on the outer peripheral face of the rotating shaft 9, a hollow cylindrical bush 21 in which magnets 22 are embedded at four positions at even intervals on the circumference thereof is pressed in from the left side of the inner ring magnetic substance 10 (See FIG. 2 and FIG. 3).

A ferromagnetic metal, for example, an Fe—Ni series magnetic alloy including 35 wt % to 80 wt % of nickel is a suitable material for the rotor 28 and the inner ring magnetic substance 10. A fluorine-resistant coating such as nickel plating is applied on the surfaces of the rotor 28 and the inner ring magnetic substance 10 so that the ferromagnetic metal does not directly touch the laser gas.

Meanwhile, on the inner peripheral face of the supporting member 23, the hollow cylindrical stator 27 is pressed in from the left side of FIG. 2 to a position where the stator 27 abuts on an end face 25A of a housing protrusion 25 formed protruding from the inner peripheral face of the supporting member 23. The stator 27 is composed of an iron core and a coil, for example. As described above, the outer peripheral face of the rotor 28 and the inner peripheral face of the stator 27 are opposite each other, and the rotor 28 and the stator 27 compose the motor 29 for driving the cross flow fan 1.

On the inner peripheral face of the supporting member 23, a hollow cylindrical bush 52 having a predetermined axial thickness is also pressed in from the left side of the stator 27. Further from the left side of the bush 52, the outer ring magnet coil 11, and a bush 39 having gap sensors 38 each for measuring the value of the gap 4 between the outer peripheral face of the inner ring magnetic substance 10 and the inner peripheral face of the outer ring magnet coil 11 are pressed in.

The bush 39 is provided with an O-ring groove 45 in its outer peripheral portion, and an O-ring 46 is fitted in the O-ring groove 45 to tightly close a space between the bush 39 and the inner peripheral face of the supporting member 23. A thin cylindrical partition 47 is inserted from the inner peripheral face of the bush 39 all along to the inner peripheral face 25B of the housing protrusion 25, thus covering the inner peripheral sides of the outer ring magnet coil 11, the stator 27, and the bush 39. A clearance 48 between the partition 47 and the bush 39 and the supporting member 23, is welded over the entire periphery, which allows the outer ring magnet coil 11 and the stator 27 to be shielded from the laser gas in the chamber 2. Incidentally, a metal having corrosion resistance such as SUS 316 is a suitable material for the bush 39 and the partition 47.

Next, one example of a means for controlling the gap 4 of the magnetic bearing 12 and suppressing the vibration of the cross flow fan 1 will be explained. Such control is called gap control.

Figure 3:
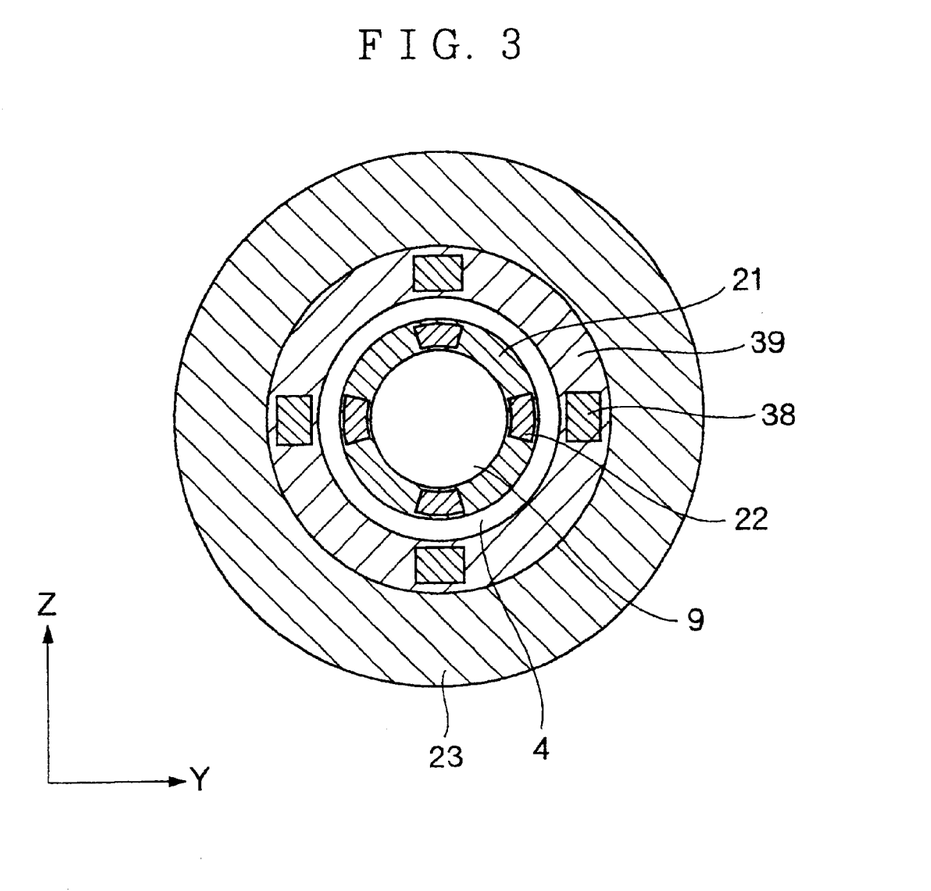
FIG. 3 is a sectional view taken along the line 3—3 in FIG. 2.

As shown in FIG. 3, the gap sensors 38 are located at even intervals on the same circumference, for example, in four positions respectively in Y-, -Y-, Z-, and -Z-directions. A space between each of the gap sensors 38 and each of the corresponding magnets 22 embedded in the bush 21 pressed into the rotating shaft 9 is measured, whereby a value of the gap 4 in each of the Y-, -Y-, Z-, and -Z-directions relative to the rotating shaft 9 can be measured. Each of the gap sensors 38 outputs signal output according to the measured value to the gap controller 20 electrically connected thereto. The above gap sensor 38 and the magnet 22 are one example of a gap measuring means for measuring the value of the gap 4.

The outer ring magnet coil 11 is disposed in almost the same phase on the circumference as the gap sensors 38. An electric current can be sent to each outer ring magnet coil 11 from the gap controller 20 independently of each other. Magnetic field intensity in each of the Y-, -Y-, Z-, and -Z-directions is changed to thereby change attraction for attracting the inner ring magnetic substance 10, thus controlling the gap 4 in each of the Y-, -Y-, Z-, and -Z-directions. The above outer ring magnet coil 11 and the gap controller 20 are one example of a gap controlling means for controlling the value of the gap to a predetermined value.

The procedure of the gap control is as follows.

Suppose that the inner ring magnetic substance 10 moves in the -Y-direction due to vibration of the cross flow fan 1, and hence the gap 4 in the -Y-direction relative to the outer ring magnet coil 11 reduces. The gap sensors 38 report the result to the gap controller 20. In response to the report, the gap controller 20 increases the amount of an electric current sent to the outer ring magnet coil 11 disposed in the +Y-direction to attract the inner ring magnetic substance 10 in the +Y-direction, thereby increasing the gap 4 in the -Y-direction. Concerning the other Y-, Z-, and -Z-directions, the procedure is the same as above.

As described above, the gap controller 20 controls the amount of the electric current sent to the outer ring magnet coil 11 based on the signal output from the gap sensors 38 so that the values of the gap 4 are uniform in the Y-, -Y-, Z-, and -Z-directions. As a result, vibration of the rotating shaft 9 due to vibration of the cross flow fan 1 can be suppressed.

Next, the case where the cross flow fan 1 excessively vibrates beyond predetermined amplitude on the grounds that the cross flow fan 1 resonates or the blade section 3 twists (which is called abnormal vibration hereinafter) will be explained. In this case, in spite of the aforesaid gap control, the rotating shaft 9 excessively vibrates so that the gap 4 can not be uniform in the Y-, -Y-, Z-, and -Z-directions, in which case the touch-down bearing 15 prevents the abnormal vibration from increasing more, thereby preventing the breakage of the magnetic bearing 12.

Namely, the touch-down bearing 15 is attached to the bearing holder 16 as described above. The touch-down bearing 15 includes an outer ring 15A, an inner ring 15B, and a ball 15C put between the outer ring 15A and the inner ring 15B via a cage (not illustrated). The outer ring 15A is fixed to the bearing holder 16. The inner peripheral face of the inner ring 15B is opposite the outer peripheral face of the rotating shaft 9 with a clearance 49 having a predetermined space. The space is smaller than the value of the gap 4 between the outer peripheral face of the inner ring magnetic substance 10 and the inner peripheral face of the outer ring magnet coil 11 which compose the magnetic bearing 12.

The aforesaid disposition of the touch-down bearing 15 on the outer peripheral portion of the rotating shaft 9 permits the outer peripheral face of the rotating shaft 9 to collide with the inner ring 15B of the touch-down bearing 15 before the inner ring magnetic substance 10 collides with the outer ring magnet coil 11 when the abnormal vibration occurs, thereby preventing the inner ring magnetic substance 10 from colliding with the outer ring magnet coil 11 and consequently protecting the inner ring magnetic substance 10 and the outer ring magnet coil 11.

However, in such great vibration that the outer peripheral face of the rotating shaft 9 collides with the touch-down bearing 15, the rotating shaft 9 and the touch-down bearing 15 are sometimes broken when the cross flow fan 1 continues to rotate. To avoid this, the rotation of the cross flow fan 1 is stopped in the following procedure.

First, based on the output signal from the gap sensor 38, the gap controller 20 detects that the value of the gap 4 is outside a predetermined range and reports it to the laser controller 18.

The laser controller 18 then outputs a command to a high voltage power supply to stop the high voltage output applied across the discharge electrodes of the excimer laser device, and thereafter outputs a command to the motor controller 19 to stop the electric current supplied to the stator 27. Thus, the motor 29 stops after laser oscillation stops, and the cross flow fan 1 gradually stops its rotation and comes to a stop with the rotating shaft 9 being supported by the touch-down bearing 15 or the magnetic bearing 12.

It is desirable to eliminate the cause of abnormal vibration by opening the chamber 2, for example, after the cross flow fan 1 stops, and then to put the motor 29 into action to drive the cross flow fan 1, thus resuming the laser oscillation.

Incidentally, since the above touch-down bearing 15 is disposed in the laser gas, all of the outer ring 15A, the inner ring 15B, and the ball 15C need to have corrosion resistance to the laser gas. Moreover, when lubricant such as grease or the like is used, the lubricant reacts with the laser gas to thereby generate an impure gas, resulting in the contamination of the laser gas. Hence, the lubricant can not be used.

As a result, alumina ceramics with purity of 99.5% or more, for example, are suitable materials for the touch-down bearing 15. If the outer ring 15A, the inner ring 15B, the ball 15C, and the cage are manufactured from the above alumina ceramics, they can have corrosion resistance to the laser gas. Moreover, the rotation of the rotating shaft 9 can be temporarily supported until the cross flow fan 1 stops.

As another example of the material of the touch-down bearing 15, the outer ring 15A, the inner ring 15B, and the cage may be composed of stainless steel or nickel-plated metal, and the ball 15C may be composed of the aforesaid alumina ceramics, for example. Alternatively, all of the outer ring 15A, the inner ring 15B, the ball 15C, and the cage may be composed of nickel-plated metal.

Alternatively, if all of the outer ring 15A, the inner ring 15B, and the ball 15C are composed of alumina ceramics or the outer ring 15A and the inner ring 15B are composed of stainless steel and the ball 15C is composed of alumina ceramics, while the cage is composed of Teflon, the touch-down bearing 15 can have higher lubricity.

Figure 4:
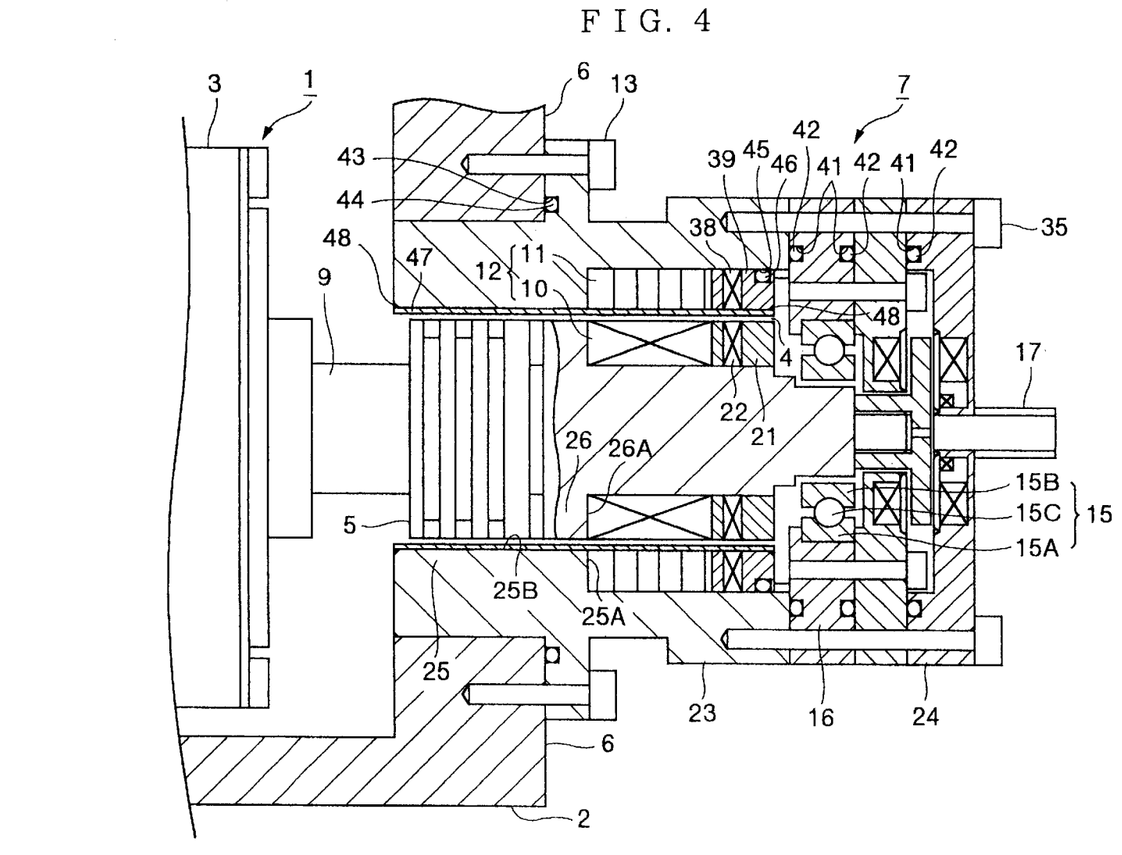
FIG. 4 is a detailed sectional view of the vicinity of a bearing housing in FIG. 1.

The inside of the bearing housing 7 has almost the same configuration as the inside of the motor housing 8 except that the rotor 28 and the stator 27 are not provided as shown in FIG. 4. Specifically, also in the inside of the bearing housing 7, the vibration of the cross flow fan 1 is suppressed by controlling the gap so that the gap 4 is uniform in the Y-, -Y-, Z-, and -Z-directions. The touch-down bearing 15 is mounted on the outer periphery of the rotating shaft 9 to protect the magnetic bearing 12 against the abnormal vibration of the cross flow fan 1.

As explained above, according to the present invention, in the excimer laser device in which the rotating shaft 9 of the cross flow fan 1 is supported by the magnetic bearings 12, the gap measuring means each for measuring a value of the gap 4 of the magnetic bearing 12 is provided, and the gap control is carried out in such a manner that the values of the gap 4 are uniform in respective directions. Thus, movement of the rotating shaft 9 can be suppressed, thereby decreasing the vibration of the cross flow fan 1. As a result, the optical axes of optical elements of the excimer laser device scarcely deviate, thereby stabilizing the characteristic of laser light.

Further, the touch-down bearing 15 which catches the rotating shaft before the magnetic bearing 12 collides therewith when abnormal vibration occurs is provided, thereby preventing the breakage of the magnetic bearing 12. Furthermore, the value of the gap 4 of the magnetic bearing 12 is measured in each direction, and when the value is smaller than a predetermined value, laser oscillation and the rotation of the motor 29 are stopped. As a result, the cross flow fan 1 no longer continues to rotate in the state of abnormal vibration, thereby preventing the breakage of the cross flow fan 1 and the touch-down bearing 15.

Incidentally, although in this embodiment, the excimer laser device in which the motor housing 8 is attached on an outer wall of the chamber 2 and the cross flow fan 1 is directly driven by the motor 29 provided in the motor housing 8 is explained as an example, the scope of the present invention is not limited to the above embodiment.

Namely, the present invention is applicable to all excimer laser devices which use the magnetic bearing 12 as a bearing of the cross flow fan 1. For example, as shown in the aforesaid Japanese Patent Laid-open No. 10-173259, an excimer laser device in which the cross flow fan 1 is driven from the outside of the chamber 2 via a magnetic torque coupling is also suitable.

Further, although the excimer laser device including two of the magnetic bearings 12 is explained as an example, the number thereof is not limited to two, and hence an excimer laser device including more than two magnetic bearings 12 is also suitable. In this case, the touch-down bearing 15 is usually disposed in the vicinity of each of both ends of the rotating shaft 9 as in this embodiment, but it may be disposed in other places. Moreover, the number of the touch-down bearings 15 is not limited to two, and more than two touch-down bearings 15 are also available.

Also in the case where the magnetic bearing 12 is composed of permanent magnets 30 and 31 as explained in Background Art, the breakage of the magnetic bearing 12 can be prevented by providing the touch-down bearing 15. If the gap measuring means for measuring the value of the gap 4 is provided in the above case and laser oscillation and the rotation of the motor 29 are stopped when the gap 4 of the magnetic bearing 12 is smaller than the predetermined value, no breakage occurs in the cross flow fan 1 nor the touch-down bearing 15, which is more suitable.

Namely, the present invention is effective in the magnetic bearing 12 including the inner ring section 10, 30 such as the permanent magnet 30, the inner ring magnetic substance 10, or the like and the outer ring section 11, 31 such as the permanent magnet 31, the outer ring magnet coil 11, or the like.

What is claimed is:

1. A gas laser device including a halogen gas including magnetic bearings each having an inner ring section mounted on the outer periphery of a rotating shaft and an outer ring section supported by a chamber, and a cross flow fan rotatably supported in a non-contact state in said chamber by said magnetic bearings via said rotating shaft and circulating a laser gas in said chamber, comprising:

touch-down bearings on the outer peripheral side of said rotating shaft, a partition wall provided at an inner peripheral side of said outer ring section, for insulating said outer ring section from the laser gas, wherein said outer ring sections of said magnetic bearings are sealed on the side of said partition wall away from said laser gas, and wherein said touch-down bearings are in the same space as said rotating shaft, wherein the inner peripheral face of an inner peripheral portion of said touch-down bearing and the outer peripheral face of said rotating shaft are disposed opposite each other with a predetermined clearance which is not substantially zero, and when said rotating shaft is normally rotated, said touch-down bearing and said rotating shaft are kept at a non-contact state, and wherein the predetermined clearance is smaller than a gap between the outer periphery face of said magnetic bearing inner ring section and an inner periphery face of said partition wall, and when said rotating shaft abnormally vibrates, said touch-down bearing and said rotating shaft are in contact with each other to prevent said magnetic bearing inner ring section from being in contact with said partition wall.

2. The gas laser device including the halogen gas according to claim 1, said gas laser device further comprising:

gap measuring means for measuring a value of a gap between the outer periphery face of said magnetic bearing inner ring section and an inner periphery face of said partition wall, and gap controlling means each for controlling said gap within a predetermined range based on signal output from said gap measuring means.

3. The gas laser device including the halogen gas according to claim 1, said gas laser device further comprising:

gap measuring means for measuring a value of a gap between the outer periphery face of said magnetic bearing inner ring section and an inner periphery face of said partition wall, wherein laser oscillation is stopped and rotation of a motor for driving said rotating shaft is stopped when said measured value is smaller than a predetermined value.

* * * * *